United States Patent
Jones et al.

(10) Patent No.: US 8,194,129 B2
(45) Date of Patent: Jun. 5, 2012

(54) WEIGHT MONITORING SYSTEM FOR SCRAP AND RECYCLED MATERIALS

(75) Inventors: David H. Jones, Hawthorne, CA (US); Douglas A. Kunnel, Irvine, CA (US); Robert J. Megdal, Paradise Valley, AZ (US)

(73) Assignee: MJK Holdings, LLC, Dover, DE (US)

( * ) Notice: Subject to any disclaimer, the term of this patent is extended or adjusted under 35 U.S.C. 154(b) by 1092 days.

(21) Appl. No.: 11/948,821

(22) Filed: Nov. 30, 2007

(65) Prior Publication Data

US 2009/0201369 A1 Aug. 13, 2009

Related U.S. Application Data

(60) Provisional application No. 60/903,000, filed on Feb. 21, 2007.

(51) Int. Cl.
*H04N 7/18* (2006.01)
(52) U.S. Cl. ...................................... 348/143
(58) Field of Classification Search .................. 348/143
See application file for complete search history.

(56) References Cited

U.S. PATENT DOCUMENTS

| | | | | |
|---|---|---|---|---|
| 4,285,426 A * | 8/1981 | Cahill | .......................... | 194/209 |
| 4,463,844 A * | 8/1984 | Huffman et al. | .............. | 194/213 |
| 4,819,015 A * | 4/1989 | Bullivant et al. | .......... | 340/568.8 |
| 5,150,101 A * | 9/1992 | Goris et al. | ................ | 340/568.8 |
| 5,229,749 A * | 7/1993 | Yenglin | ..................... | 340/568.8 |
| 5,235,325 A | 8/1993 | McCaughan, Jr. | | |
| 5,285,860 A | 2/1994 | Wirth | | |
| 5,478,974 A | 12/1995 | O'Dea | | |
| 5,596,179 A | 1/1997 | Sakaeda | | |
| 5,780,782 A | 7/1998 | O'Dea | | |
| 5,814,771 A | 9/1998 | Oakes et al. | | |
| 5,837,945 A * | 11/1998 | Cornwell et al. | ............. | 177/136 |
| 5,917,159 A | 6/1999 | Kostiuk | | |
| 6,176,774 B1 * | 1/2001 | Filiberti et al. | ................. | 453/32 |
| 6,177,876 B1 | 1/2001 | Krueger | | |
| 6,580,037 B1 * | 6/2003 | Luke | .......................... | 177/25.13 |
| 6,657,547 B2 | 12/2003 | Ching-Yao | | |
| 6,970,094 B2 | 11/2005 | Yamashita et al. | | |
| 6,983,883 B2 * | 1/2006 | Ridling | ......................... | 235/385 |

(Continued)

FOREIGN PATENT DOCUMENTS

KR 2003003979 A 1/2003

(Continued)

OTHER PUBLICATIONS

PCT Search Report dated Apr. 28, 2008 as issued by the Korean Patent Office for PCT Application PCT/US2007/025581.

*Primary Examiner* — Imad Hussain
(74) *Attorney, Agent, or Firm* — Steptoe & Johnson LLP

(57) ABSTRACT

A scrap metal recycling monitoring system, wherein a container, identified and of a known tare weight is associated with a scale while scrap metal is placed therein. The scale continuously monitors the weight of the container, and can be polled, or automatically produces an auditable data stream revealing the change in weight of the container over time as it is associated with the scale. A camera records the container while it is on the scale and also produces auditable image data. As containers near capacity, a notice is automatically generated to coordinate dispatch activities of persons transporting containers.

8 Claims, 1 Drawing Sheet

U.S. PATENT DOCUMENTS

| | | |
|---|---|---|
| 7,113,081 B1 | 9/2006 | Reichow et al. |
| 7,780,081 B1 * | 8/2010 | Liang ............................ 235/383 |
| 2002/0022968 A1 * | 2/2002 | Shimada et al. .................. 705/1 |
| 2003/0004751 A1 | 1/2003 | Ng et al. |
| 2003/0172013 A1 | 9/2003 | Block et al. |
| 2004/0206759 A1 * | 10/2004 | Busch ............................ 220/315 |
| 2005/0077352 A1 * | 4/2005 | Gudbjartsson ................ 235/385 |
| 2005/0145693 A1 * | 7/2005 | Baitz et al. .................... 235/383 |
| 2006/0238346 A1 | 10/2006 | Teller |
| 2007/0052586 A1 | 3/2007 | Horstemeyer |
| 2007/0079804 A1 * | 4/2007 | Nakayama ................ 123/339.15 |
| 2007/0227784 A1 * | 10/2007 | Gudbjartsson et al. ........ 177/255 |
| 2007/0299686 A1 * | 12/2007 | Hu et al. ............................ 705/1 |
| 2008/0035727 A1 | 2/2008 | Stanzel et al. |
| 2008/0296374 A1 * | 12/2008 | Gonen et al. .................. 235/385 |
| 2009/0261981 A1 * | 10/2009 | Jones et al. .................... 340/666 |

FOREIGN PATENT DOCUMENTS

| | | |
|---|---|---|
| KR | 0408385 Y | 2/2006 |
| KR | 20060113231 A | 11/2006 |

* cited by examiner

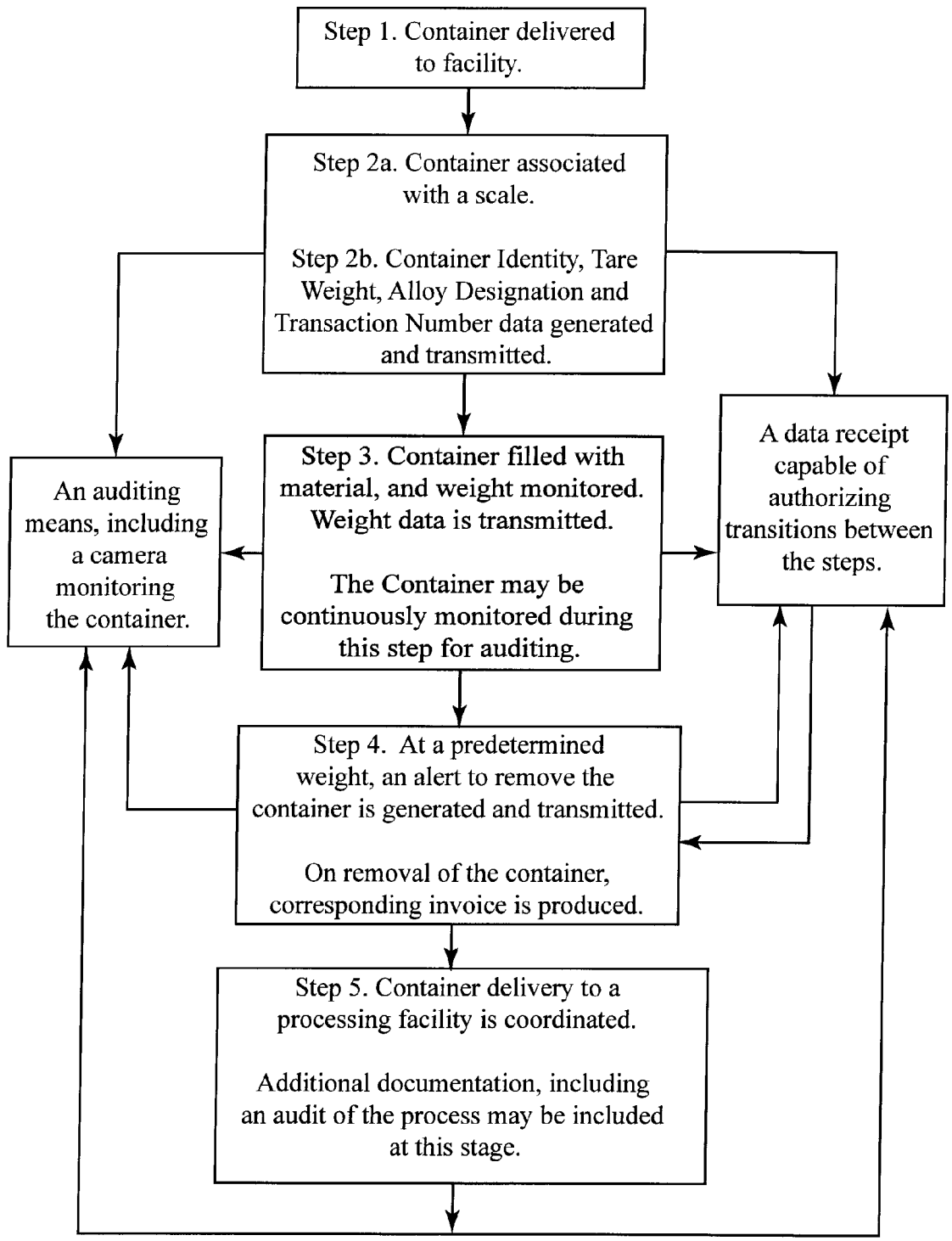

WEIGHT MONITORING SYSTEM FOR SCRAP AND RECYCLED MATERIALS

CROSS-REFERENCE TO RELATED APPLICATION

This application claims the benefit of the priority filing date of provisional application No. 60/903,000 filed on Feb. 21, 2007.

FEDERALLY SPONSORED RESEARCH

Not Applicable

SEQUENCE LISTING OR PROGRAM

Not Applicable

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

Scrap metal recycling is known in the art. Production facilities produce waste metal which is typically stored at a production site, in containers owned and operated by a waste management company. The containers accumulate waste metal and when full, are exported to a remote site where the metal is recycled. Because of the volume of waste metal produced during industrial processes, it is common for persons with access to the containers to remove an amount of metal from a container and sell the removed metal for profit, while reporting a reduced weight to the production and waste management facilities. Therefore, a need exists for a system that prevents the removal of waste material from a production site, prior to and during the waste metal recycling process.

It is an object of the present invention to provide a waste monitoring system that monitors waste material as it is produced by a production company and stored at the production site. A further object of the invention is to provide a weighing system that measures the tare weight of a waste receptacle, monitors and records the increase in weight as material is disposed in the receptacle, transmits the data to auditing parties, and produces a report based on the weight data. Yet another object of the invention is to provide a monitoring system that provides an image of the receptacle while it is located in the production facility, which can be audited by authorized parties. These and other objects of the invention will become evident from the appended summary, description and claims.

SUMMARY

An improved scrap metal recycling and waste monitoring system wherein a container owned by a waste processor is delivered to a production facility; the production facility produces waste material, including scrap metal, and fills the container, which is maintained at the production facility.

Containers are identified individually by bar code, are portable and of standardized sizes, and are dedicated to specific materials, including various types of scrap metal. In the process, a container is associated with a scale. Scales are programmed with the identity and tare weight of a container, the type of material that will fill the container and the value of that material according to weight. When an empty container is delivered to a production facility, a transaction number is generated and assigned to the container. The container maintains contact with the scale throughout the transaction, enabling the scale to continuously monitor the weight of the container as it increases.

A data transmission means gathers the container identification, tare weight, alloy designation, and transaction number and transmits the data to one or more recipients; including designated representatives of the processor, production company or a third party auditor.

The scale monitors waste material entering the container and records weight change and time information. A data transmission means transmits this data via email to designated representatives of the production company, processor or third party auditor. In addition to transmitting weight and time data when material is deposited in a container, a further embodiment of the invention is contemplated wherein the scale is in constant communication with designated recipients and maintains a continuous stream of data.

The data gathered by the scale, stored in the scale or transmitted to a remote computer for storage, is under conditional access to preserve its integrity. In a further embodiment, in addition to recording and storing the data, the system prints weight change reports at the scale, at a remote location, or at other locations designated by users.

A lockable computer control, including a secure housing, protects the data from interference, while permitting access by authorized users. Additionally, the system may comprise a mechanism for locking a container to a scale, and sealing when removed from the scale to prevent access to the materials inside. Devices including key cards may be employed to grant access to authorized users.

The scale tracks changes in the weight of a container, alerting the processor once a predetermined weight is reached. The identity of the container includes capacity information in addition to weight information. When a container reaches a weight associated with a predetermined percentage of capacity, the scale will cause the transmission of an advance warning that the container is nearing capacity. In this manner it is possible to schedule container removal in advance.

Once the scale transmits data that a certain quantity of material is in the container, The processor removes the container from the production company, and data regarding the quantity of material in the container. This data may comprise all of the data generated by the scale during the instant transaction. The data may be transmitted physically in the form of an invoice, or by any other means, including electronically; and may be produced at the time the container is removed from the scale or earlier.

In another preferred embodiment of the system, a camera monitors the container when the container is on the scale. The camera can generate a continuously recorded video for monitoring the container, and may be controlled by an auditing party, or controlled internally by the scale. The camera may also be polled to transmit live images from a remote location. Auditors of the video generated by the system may also comprise authorized persons from the processor or production company.

Pricing data for material, and a predetermined pricing schedule is maintained in the system. By accessing weight data gathered by the scale, an invoice for the material deposited in a container can be generated at any time. The data collected using container identifiers can be assembled into an auditable format and transmitted to a receiving party, including the processor, production facility or third parties; wherein audit data may further comprise images captured by the camera. Additionally, collected data can be used to coordinate dispatch activities for transporting containers as they near capacity.

FIGURES

FIG. 1 is a block diagram of the steps involved in executing the weight monitoring system of the present invention.

DESCRIPTION

Referring to FIG. 1, an improved scrap metal, recycling, and waste monitoring system is shown and described. Referring to Step 1; using the system, a container owned by a waste processor, in one preferred embodiment a scrap metal recycler, is delivered to a production facility producing waste material, including scrap metal. The container is maintained at the production facility in some proximity to the machinery producing the waste material.

The container comprises a means of holding a quantity of scrap metal. In one embodiment, a known container, identified by bar code or other identification means is used. In a further embodiment, the container comprises a portable standardized container, including a "roll-off" container common to the waste industry. In yet a further embodiment, the container is dedicated to containing a specific material, including a particular type of scrap metal.

Referring to Step 2, the container is associated with a weighing means, programmed with the identity of the container, the identity of the contents that will fill the container, including a scrap metal designation, and the tare weight of the container. When an empty container is delivered to a production facility, or at another predetermined designated time, a transaction number is generated and assigned to the container. The container maintains contact with the weighing means throughout the transaction, enabling the weighing means to continuously monitor the weight of the container. In one preferred embodiment, the weighing means comprises a scale capable of supporting the container, identifying the start of a transaction, and generating and assigning a transaction number.

When the container is delivered to the production facility and installed on the weighing means, a data transmission means gathers the container identification, tare weight, alloy designation, and transaction number and transmits the data to one or more designated recipients. In one preferred embodiment, the recipients of the data include designated representatives of the processor and production company. In further embodiments, the data may be transferred to a third party designated as a transaction auditor. Although the data may comprise an email transmission, the system contemplates any method of communicating the initial transaction data.

Referring to Step 3, the production company produces waste material, including scrap metal, which enters the container while the container is on the weighing means. Any time material is deposited in the container, the scale monitors and records the weight change of the container, and the time of the change. The data transmission means transmits this data to designated representatives of the processor and production company. In further embodiments, the data may be transferred to a third party designated as a transaction auditor. Although the data may comprise an email transmission, the system contemplates any method of communicating the initial transaction data.

In addition to transmitting weight and time data any time material is deposited in a container, a further embodiment of the invention is contemplated wherein the weighing means is in constant communication with designated recipients and maintains a continuous stream of data. In an alternate embodiment, persons receiving weight, time and weight change data have the ability to poll the weighing means, causing it to send data at the time of polling.

The data gathered by the weighing means may be stored in the weighing means, or transmitted to a remote computer for storage. In either embodiment, the data is stored under conditional access to preserve the integrity of the data. In a further embodiment, in addition to recording and storing the weight and weight change data, the system prints reports documenting the weight change at the weighing means, a remote location, or other locations designated by users.

In embodiments where the weighing means also comprises the data storage and transmission means, a lockable computer control, including a secure housing protects the data from interferences, while permitting access by authorized users. Additionally, the containing means may comprise a mechanism for locking the containing means to the weighing means, and sealing the containing means once it is removed from the weighing means, to prevent access to the materials inside. Access means, including key cards, or PIN numbers may be employed to grant access to authorized users.

In one preferred embodiment, the containing means, weighing means, data collection and data transmission means are all contained in a single unit. It is contemplated that in this configuration, a unit; for example, an aluminum recycling storage and weighing means can be stored at a location where depositors deliver waste aluminum.

Referring to step 4, the weighing means tracks changes in weight of the container, alerting the owner of the containing means once a predetermined weight is reached. In another embodiment of the invention, the identity of the containing means includes capacity information in addition to weight information. When the weighing means detects that material in the containing means has reached a predetermined level, the weighing means will cause the data transmission means to transmit an advance warning that the containing means is nearing capacity and will need to be emptied. In this manner it is possible to schedule removal of the containing means before it reaches capacity.

Referring to step 5, once the weighing means has caused a transmission of data that the certain quantity of material is in the containing means, The receiving party causes the containing means to be picked up from the production company and delivered to the processor. In addition to the containing means, the processor also receives data regarding the quantity of material in the container. This data may comprise all of the data generated by the weighing means as the containing means was filled. The data may be transmitted physically in the form of an invoice, or by any other means, including electronically. In an alternate embodiment, an invoice may be produced at the time the container is removed from the weighing means.

Referring to FIG. 1 generally, in one preferred embodiment of the system, a camera means records an image, including a moving image, of the containing means when the containing means is associated with the weighing means. The images recorded by the camera means may generate a continuously recorded video that monitors the containing means, or in various alternate embodiments, may generate recorded video only when the container is accessed, including still frame images, and may be controlled by an auditing party, including the party receiving weight and time data, or controlled internally by the weighing means itself.

An auditing party may also poll the camera means, causing the camera means to transmit live images, or a range of images a designated time span, including the entire time the containing means is associated with the weighing means, and a live image. Recipients of the video generated by the system may also comprise authorized persons from the production company and processing company.

In one preferred embodiment, pricing data concerning a variety of materials, and a predetermined pricing schedule is maintained in the system. By accessing weight data gathered by the weighing means, an invoice for the material deposited in the containing means can be generated at any time while the containing means is associated with the weighing means, or upon removal of the containing means from the weighing means, including reduction of the containing means to its tare weight.

In another preferred embodiment, the data collected using the containing means identifiers, and weighing means can be assembled into an auditable format and transmitted to a receiving party, including the processor, production facility or third parties, wherein the audit data may also include images captured by the camera means.

In a further preferred embodiment, the data collected using the containing means is used to coordinate the pick-up and delivery activities of the containing means, by identifying which containing means are at or near capacity. It is contemplated that this process may be automated by transmitting information comprising the capacity states of one or more containing means into the dispatching system of the parties picking up and delivering containers. By providing advanced notice to parties transporting the containing means, transporting parties can dispatch drivers more efficiently.

All features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, paragraph 6. In particular, the use of "step of" in the claims herein is not intended to invoke the provisions of 35 U.S.C. §112, paragraph 6.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. A scrap metal, recycling, and waste monitoring system, comprising:
   a. at least one containing means of a known weight when empty;
   b. at least one weighing means designed to accommodate the at least one containing means;
   c. at least one data transmission means connected to the at least one weighing means for transmitting data generated by the weighing means to a remote location, wherein data is transmitted continuously to enable constant monitoring of individual or multiple containing means, including monitoring a predetermined quantitative change in the weight of a containing means, and wherein the weighing means is capable of locking a containing means to prevent access to, including removal of the containing means.

2. The system of claim 1, wherein a personalized security means, including a key or card, releases the locks of the at least one weighing means, and a data transmission means transmits a record of the event.

3. A scrap metal, recycling, and waste monitoring system, comprising:
   a. at least one containing means of a known weight when empty;
   b. at least one weighing means designed to accommodate the at least one containing means;
   c. at least one data transmission means connected to the at least one weighing means for transmitting data generated by the weighing means to a remote location, wherein data is transmitted continuously to enable constant monitoring of individual or multiple containing means, including monitoring a predetermined quantitative change in the weight of a containing means, and wherein a recording means records an image, including a moving image, of the at least one containing means any time the means is accessed including any time the weighing means detects a weight change.

4. The system of claim 3, wherein recordings captured by the system are transmitted to designated parties, including to the company generating the weighed material and the owner of the at least one containing means.

5. The system of claim 3, wherein a recording means transmits a continuous video image via a permanent data link of the at least one containing means.

6. The system of claim 3, wherein a recording means can be polled by the recipient of the video image of the at least one containing means, to permit a real-time view of the means at any time.

7. A scrap metal, recycling, and waste monitoring system, comprising:
   a. at least one containing means of a known weight when empty;
   b. at least one weighing means designed to accommodate the at least one containing means;
   c. at least one data transmission means connected to the at least one weighing means for transmitting data generated by the weighing means to a remote location, wherein data is transmitted continuously to enable constant monitoring of individual or multiple containing means, including monitoring a predetermined quantitative change in the weight of a containing means, and wherein an invoice based on a predetermined pricing schedule is generated and delivered to the appropriate party when a predetermined weight change, including any weight change, is detected; including when a container is removed or reduced to its tare weight.

8. A scrap metal, recycling, and waste monitoring system, comprising:
   a. at least one containing means of a known weight when empty;
   b. at least one weighing means designed to accommodate the at least one containing means;
   c. at least one data transmission means connected to the at least one weighing means for transmitting data generated by the weighing means to a remote location, wherein data is transmitted continuously to enable constant monitoring of individual or multiple containing means, including monitoring a predetermined quantitative change in the weight of a containing means, and wherein the data is transmitted to the dispatch operations of a trucking company to coordinate the collection and delivery of at least one containing means.

* * * * *